(12) United States Patent
McKay

(10) Patent No.: US 10,098,321 B2
(45) Date of Patent: Oct. 16, 2018

(54) COLD WATER DISPENSING DEVICE

(71) Applicant: Shannon McKay, Danville, IL (US)

(72) Inventor: Shannon McKay, Danville, IL (US)

( * ) Notice: Subject to any disclaimer, the term of this patent is extended or adjusted under 35 U.S.C. 154(b) by 255 days.

(21) Appl. No.: 15/014,875

(22) Filed: Feb. 3, 2016

(65) Prior Publication Data

US 2017/0215375 A1   Aug. 3, 2017

(51) Int. Cl.
*A01K 7/00* (2006.01)
(52) U.S. Cl.
CPC ..................................... *A01K 7/00* (2013.01)
(58) Field of Classification Search
CPC ...... A01K 39/0206; A01K 39/02; A01K 7/02; A01K 39/026; A01K 7/00
See application file for complete search history.

(56) References Cited

U.S. PATENT DOCUMENTS

| | | | | |
|---|---|---|---|---|
| 2,364,991 | A * | 12/1944 | Marshall | A01K 39/026 119/77 |
| 2,772,660 | A * | 12/1956 | Saul | A01K 7/00 119/61.54 |
| 2,791,984 | A * | 5/1957 | Franklin | A01K 5/0291 119/51.12 |
| 3,202,131 | A * | 8/1965 | Jones | A01K 5/0114 119/61.54 |
| 3,720,184 | A * | 3/1973 | Pearce | A01K 5/0225 119/51.5 |
| 5,207,182 | A | 5/1993 | Lorenzana | |
| 5,406,909 | A * | 4/1995 | Wenstrand | A01K 5/01 119/72 |
| 5,730,082 | A | 3/1998 | Newman | |
| 5,782,374 | A * | 7/1998 | Walker | A01K 5/0128 119/61.5 |
| 5,845,600 | A * | 12/1998 | Mendes | A01K 7/02 119/51.5 |
| 5,960,741 | A * | 10/1999 | Ballen | A01K 5/0114 119/51.01 |
| 6,079,361 | A * | 6/2000 | Bowell | A01K 7/02 119/52.1 |
| 6,119,628 | A | 9/2000 | Lorenzana et al. | |
| D457,692 | S | 5/2002 | Skurdalsvold et al. | |
| 6,739,284 | B1 * | 5/2004 | Olive | A01K 39/02 119/52.1 |
| 6,843,205 | B1 * | 1/2005 | Segreto | A01K 5/0114 119/515 |
| 6,971,331 | B1 * | 12/2005 | Rohrer | A01K 7/02 119/52.1 |

(Continued)

*Primary Examiner* — Magdalena Topolski

(57) ABSTRACT

A cold water dispensing device for dispensing cold water to animals includes a first housing that has a first top, which is open. An orifice is substantially centrally positioned through a first bottom of the first housing. A reservoir, which has an open neck complementary to the orifice, is positionable in the first housing. A second housing is couplable to the first bottom of the first housing. The second housing extends transversely past a front of the first housing. The second housing has a second top that is open. A bowl, which is complementary to the second housing, is insertable through the second top to rest on a second bottom of the second housing. The reservoir containing ice is invertably positioned with the open neck through the orifice. Melt from the reservoir collects in the bowl to provide cold water to pets or other animals.

16 Claims, 5 Drawing Sheets

(56) References Cited

U.S. PATENT DOCUMENTS

| | | | |
|---|---|---|---|
| 8,132,531 B1* | 3/2012 | Martin | A01K 7/04 |
| | | | 119/74 |
| 9,198,398 B2* | 12/2015 | Rogers | A01K 7/06 |
| 9,615,540 B1* | 4/2017 | Mansour | A01K 5/00 |
| 2006/0201434 A1* | 9/2006 | Kujawa | A01K 5/0128 |
| | | | 119/61.5 |
| 2010/0024735 A1* | 2/2010 | Ho | A01K 5/0114 |
| | | | 119/51.5 |
| 2010/0122660 A1* | 5/2010 | Willett | A01K 5/0142 |
| | | | 119/51.5 |
| 2011/0283948 A1 | 11/2011 | Wong | |
| 2013/0213308 A1* | 8/2013 | Koskey, Jr. | A01K 7/027 |
| | | | 119/74 |
| 2014/0209032 A1 | 7/2014 | Li | |
| 2016/0016730 A1* | 1/2016 | Supple | B65F 1/1484 |
| | | | 206/457 |
| 2016/0107799 A1* | 4/2016 | Streich | B31B 1/82 |
| | | | 220/663 |

* cited by examiner

US 10,098,321 B2

COLD WATER DISPENSING DEVICE

BACKGROUND OF THE DISCLOSURE

Field of the Disclosure

The disclosure relates to dispensing devices and more particularly pertains to a new dispensing device for dispensing cold water to animals.

SUMMARY OF THE DISCLOSURE

An embodiment of the disclosure meets the needs presented above by generally comprising a first housing that has a first top, which is open. An orifice is substantially centrally positioned through a first bottom of the first housing. A reservoir, which has an open neck complementary to the orifice, is positionable in the first housing. A second housing is couplable to the first bottom of the first housing. The second housing extends transversely past a front of the first housing. The second housing has a second top that is open. A bowl, which is complementary to the second housing, is insertable through the second top to rest on a second bottom of the second housing. The reservoir containing ice is invertably positioned with the open neck through the orifice. Melt from the reservoir collects in the bowl to provide cold water to pets or other animals.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
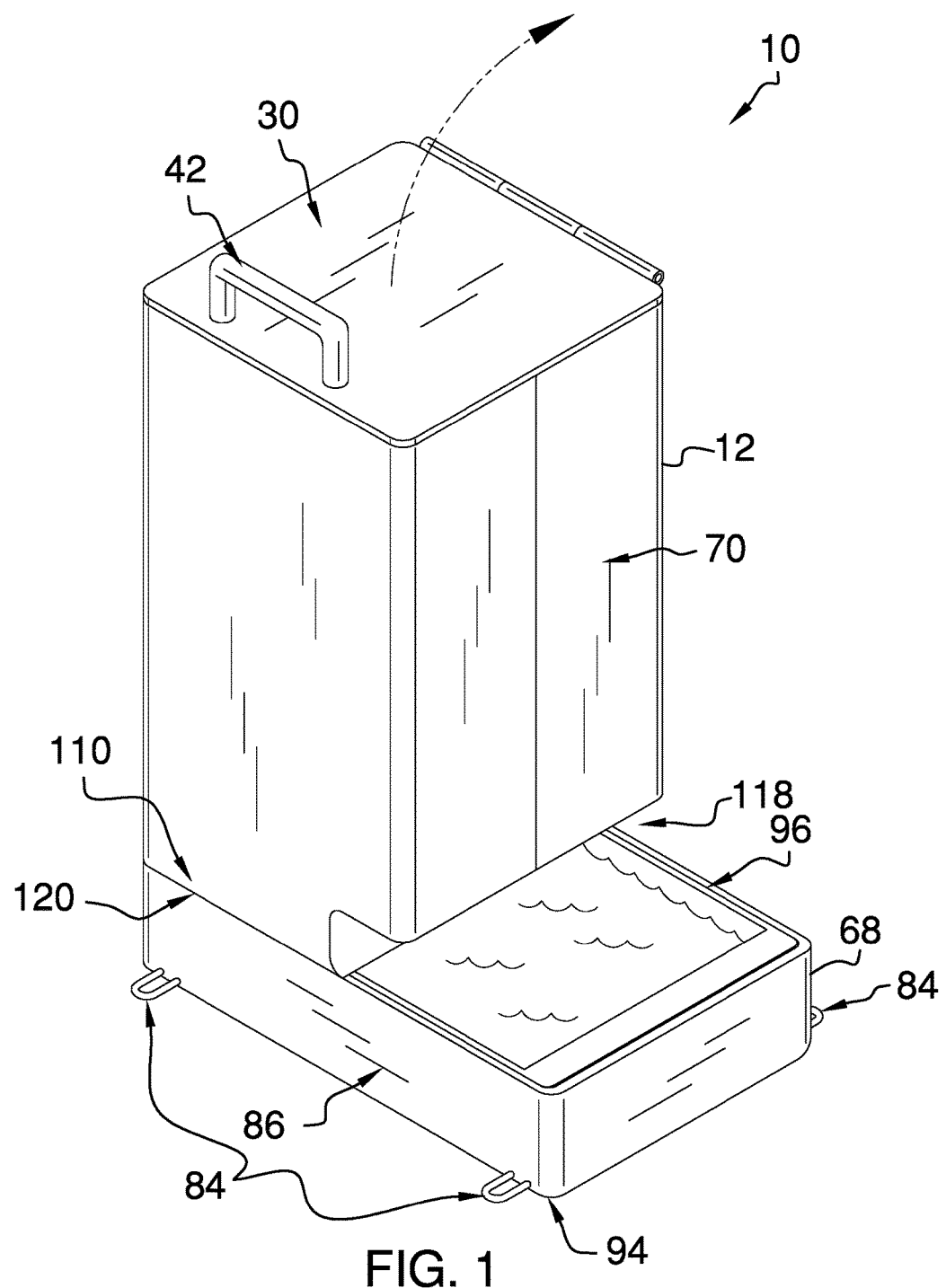
FIG. 1 is an isometric perspective view of a cold water dispensing device according to an embodiment of the disclosure.
Figure 2:
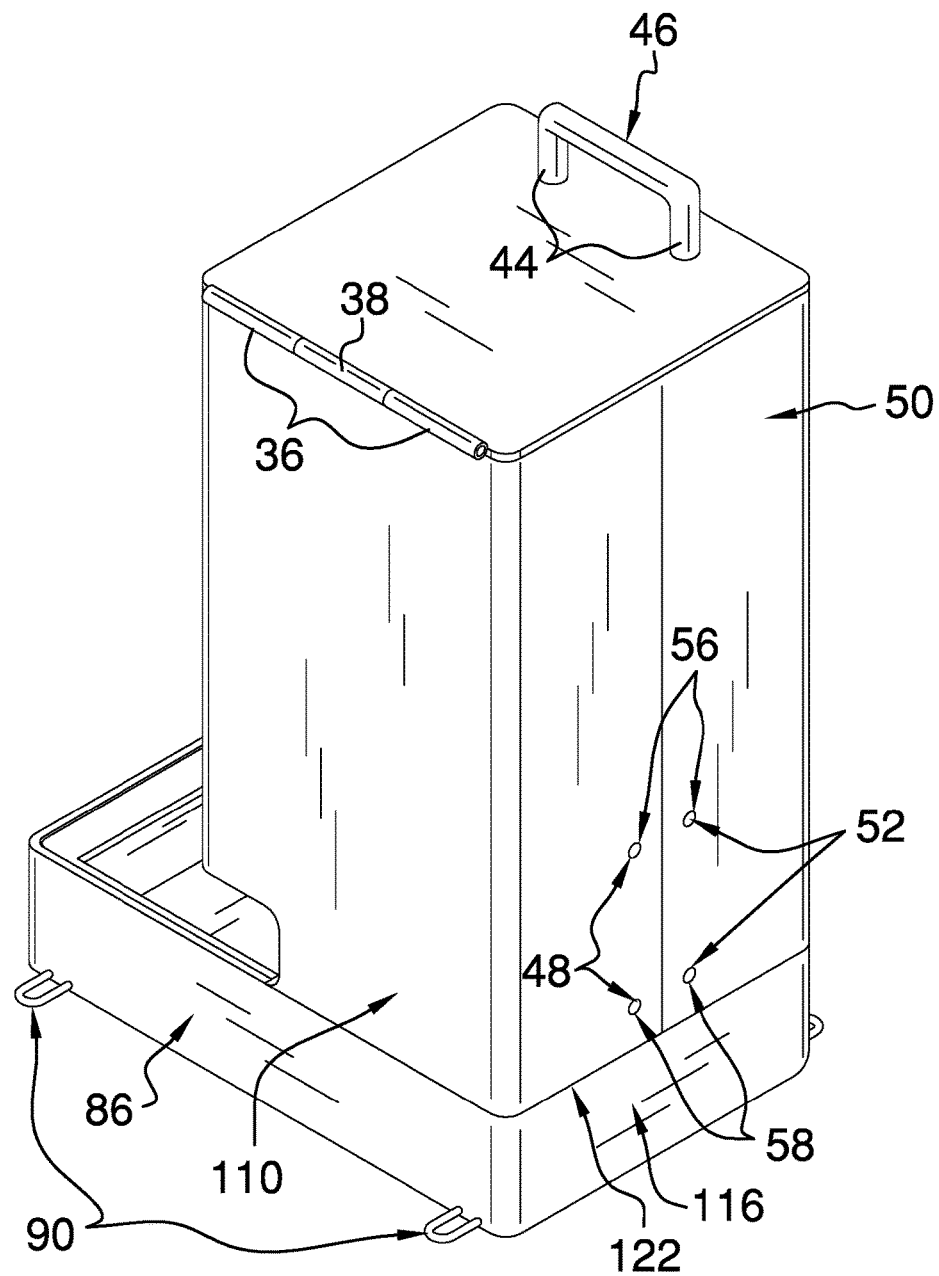
FIG. 2 is an isometric perspective view of an embodiment of the disclosure.
Figure 3:
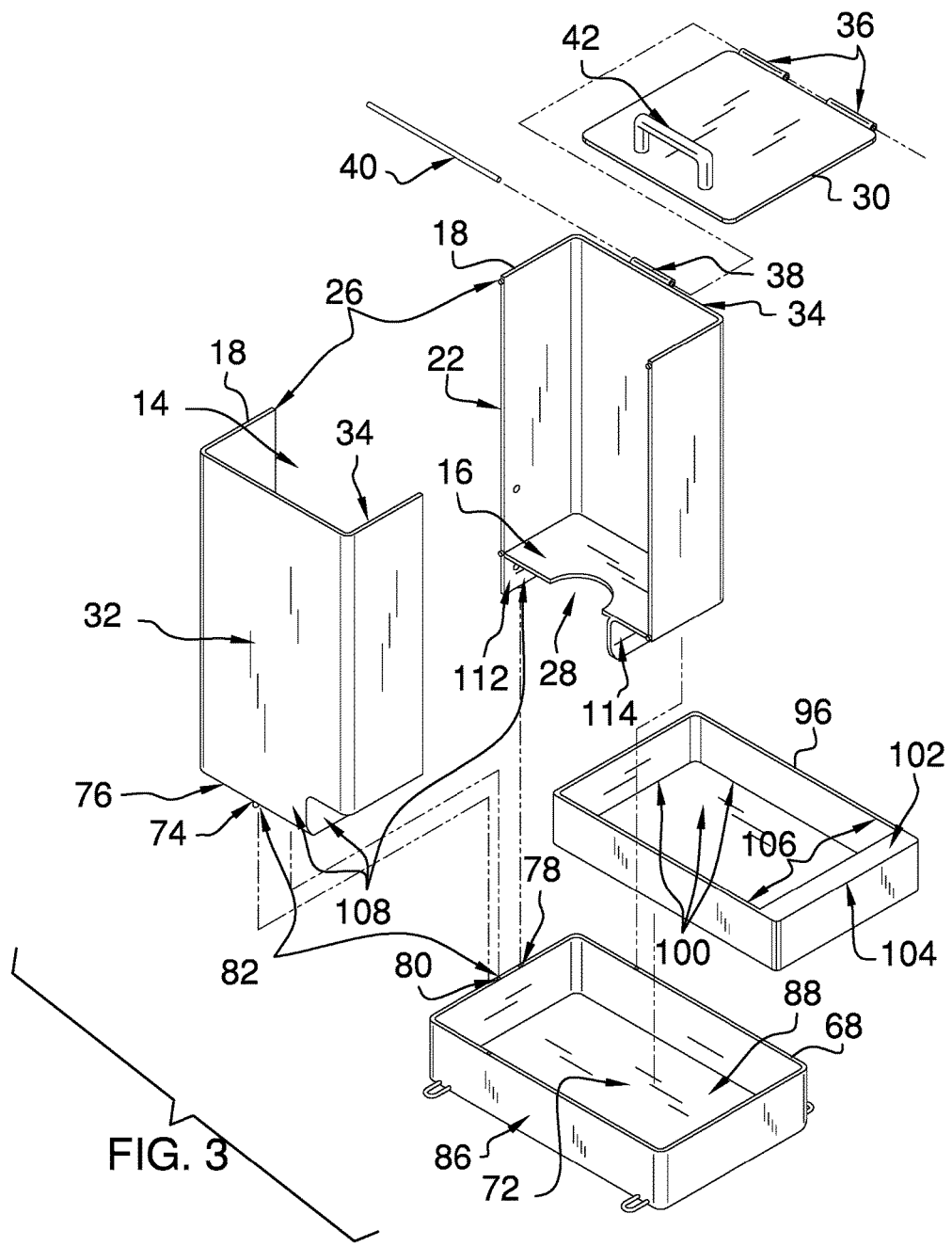
FIG. 3 is an exploded view of an embodiment of the disclosure.
Figure 4:
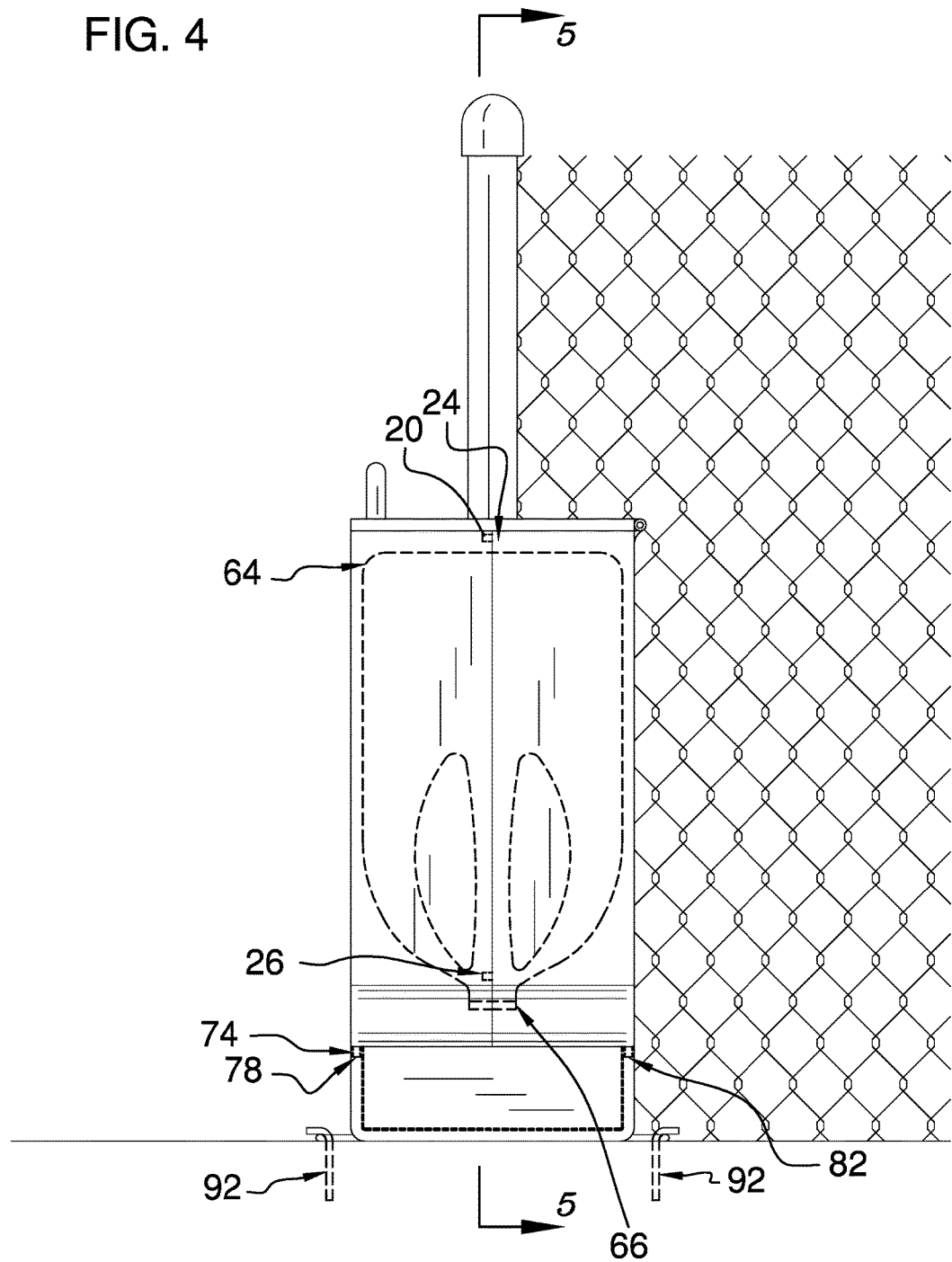
FIG. 4 is a front view of an embodiment of the disclosure.
Figure 5:
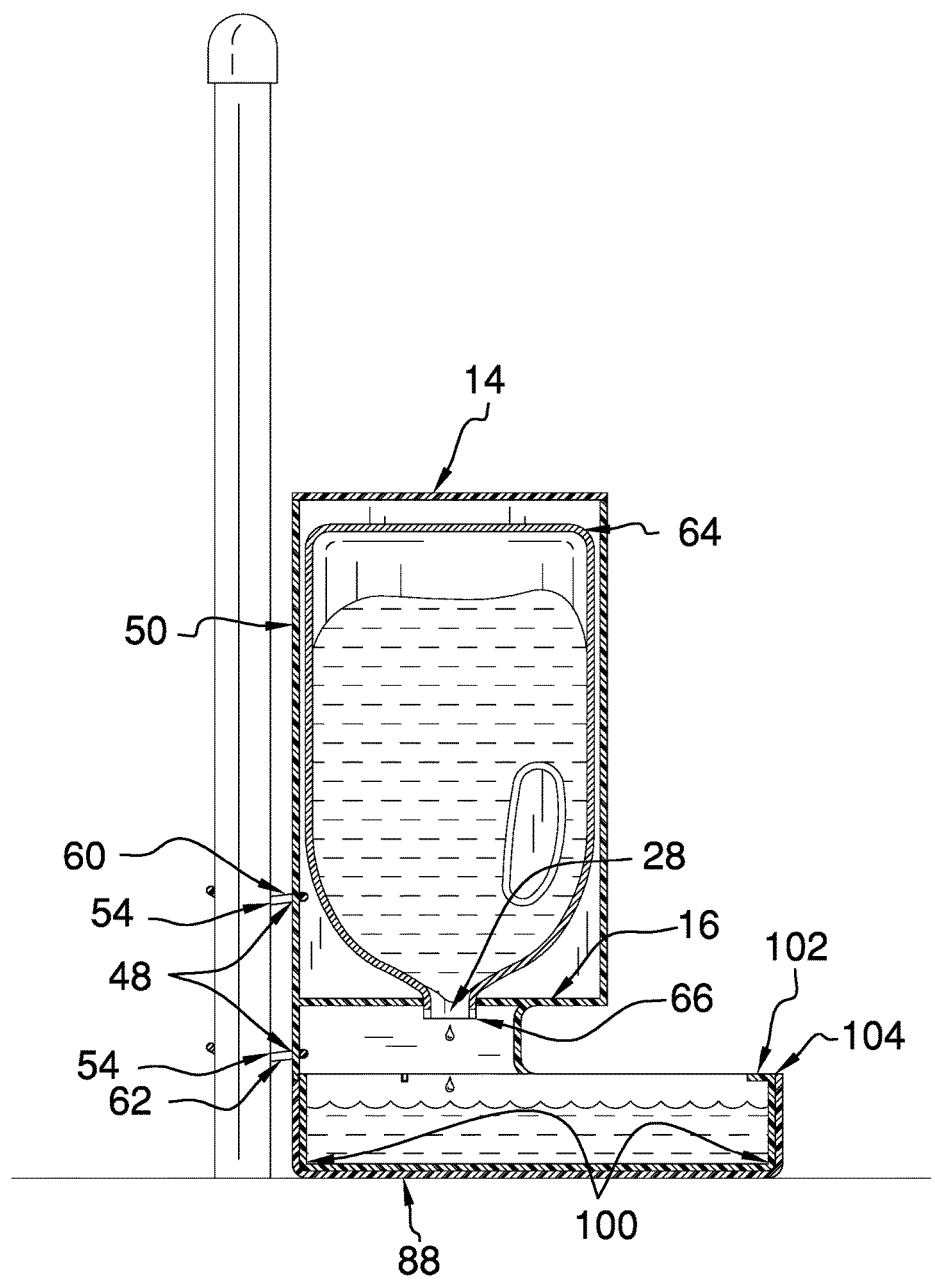
FIG. 5 is a cross-sectional view of an embodiment of the disclosure.

With reference now to the drawings, and in particular to FIGS. 1 through 5 thereof, a new dispensing device embodying the principles and concepts of an embodiment of the disclosure and generally designated by the reference numeral 10 will be described.

As best illustrated in FIGS. 1 through 5, the cold water dispensing device 10 generally comprises a first housing 12 that has a first top 14, which is open. The first top 14 and a first bottom 16 of the first housing 12 are substantially squarely shaped, such that the first housing 12 is substantially rectangularly box shaped.

Preferably, the first housing 12 comprises two vertical sections 18. Each of a plurality of first connectors 20 is coupled to a respective edge 22 of a respective vertical section 18. Each of a plurality of second connectors 24, which is complementary to the first connectors 20, is coupled to a respective edge 22 of a respective vertical section 18. Each second connector 24 is couplable to an associated first connector 20 to couple the vertical sections 18 together. Preferably, the plurality of first connectors 20 comprises four first connectors 20 and the plurality of second connectors 24 comprises four second connectors 24. Also preferably, each second connector 24 and the associated first connector 20 comprise a first snap connector 26.

An orifice 28, which is substantially circular, is centrally positioned through the first bottom 16 of the first housing 12. A lid 30, which is complementary to the first top 14, is hingedly coupled to a respective opposing side 32 of the first housing 12 proximate to an upper rim v34 of the first housing 12. The lid 30 is positioned to cover the first top 14. Each of a pair of first hinge rings 36 is coupled to the lid 30. A second hinge ring 38 is coupled to the respective opposing side 32 of the first housing 12 proximate to the upper rim 34. The second hinge ring 38 is alignable with the first hinge rings 36. A hinge rod 40 is insertable through the pair of first hinge rings 36 and the second hinge ring 38, such that the lid 30 is hingedly coupled to the first housing 12.

A handle 42 is coupled to the lid 30 distal from the respective opposing side 32. The handle 42 is positioned for grasping by the user to open the lid 30. More specifically, the handle 42 comprises a pair of verticals 44 and a horizontal 46. Each vertical 44 is coupled to and extends substantially perpendicularly from the lid 30. The horizontal 46 is coupled to and extends between the pair of verticals 44 distal from the lid 30. The horizontal 46 is positioned in substantial parallelism with the lid 30, such that the fingers of the user are insertable between the horizontal 46 and the lid 30.

Each of a plurality of couplers 48 is coupled to a back 50 of the first housing 12 proximate to the first bottom 16 of the first housing 12. The couplers 48 are configured to attach the first housing 12 to a post. Preferably, the plurality of couplers 48 comprises a plurality of holes 52 and a plurality of ties 54. Each hole 52 is positioned through the back 50 of the first housing 12. The ties 54 are complementary to the holes 52 and are positionable through respective holes 52 of the plurality of holes 52 and around the post. Preferably, the plurality of holes 52 comprises a pair of top holes 56 and a pair of bottom holes 58 and the plurality of ties 54 comprises a top tie 60 and a bottom tie 62. The bottom holes 58 are positioned through the back 50 in horizontal alignment proximate to the first bottom 16. Each top hole 56 is positioned in substantial vertical alignment with a respective bottom hole 58. The top tie 60 is positionable through the pair of top holes 56 and around the post. The bottom tie 62 is positionable through the bottom holes 58 and around the post. The top tie 60 and the bottom tie 62 are knotable to couple the first housing 12 to the post.

The device 10 also comprises a reservoir 64 that is complementary to and positionable in the first housing 12. The reservoir 64 has an open neck 66 which is complementary to the orifice 28. The open neck 66 is positioned on the reservoir 64 such that water is addable to the reservoir 64 with the reservoir positioned uprightly. The reservoir 64 is configured to accommodate freezing of the water contained is the reservoir 64. Preferably, the reservoir 64 is semi-rigid and comprises deformable plastic.

A second housing 68 is couplable to the first bottom 16 of the first housing 12. The second housing 68 extends transversely past a front 70 of the first housing 12. The second housing 68 has a second top 72, which is open.

Each of a plurality of third connectors 74 is coupled to a bottom rim 76 of the first housing 12. Each of a plurality of fourth connectors 78, which is complementary to the third connectors 74, is coupled to a top rim 80 of the second housing 68. Each fourth connector 78 is couplable to an associated third connector 74 to couple the second housing 68 to the first housing 12. Preferably, the plurality of third connectors 74 comprises four third connectors 74 and the plurality of fourth connectors 78 comprises four fourth connectors 78. Also preferably, each fourth connector 78 and the associated third connector 74 comprise a second snap connector 82.

Each of a plurality of fasteners 84 is coupled to a respective opposing side face 86 of the second housing 68 proximate to a second bottom 88 of the second housing 68. The fasteners 84 are configured to couple the second housing 68 to a horizontal surface. Preferably, the plurality of fasteners 84 comprises a plurality of loops 90 and a plurality of spikes 92. The loops 90 are coupled to a respective opposing side face 86 of the second housing 68 proximate to the second bottom 88 of the second housing 68. The spikes 92 are complementary to the loops 90, such that each spike 92 is insertable through a respective loop 90. Preferably, the plurality of loops 90 comprises four loops 90, with each loop 90 positioned proximate to a respective corner 94 of the second housing 68. Also preferably, the plurality of spikes 92 comprises four spikes 92. The loops 90 are positioned for insertion of the spikes 92, such that the spikes 92 are drivable into a horizontal surface to couple the second housing 68 to the horizontal surface.

A bowl 96, which is complementary to the second housing 68, is insertable through the second top 72 to rest on the second bottom 88 of the second housing 68. The bowl 96 has internal edges 100 that are rounded. Preferably, the bowl 96 comprises stainless steel. A grab 102 is coupled to a front lip 104 of the bowl 96. The grab 102 is coupled to and extends between opposing edges 106 of the bowl 96.

The device 10 may comprise a plurality of extender walls 108. The plurality of extender walls 108 is coupled to and extends between the first housing 12 and the second housing 68, such that the first bottom 16 of the first housing 12 is positioned above the second top 72 of the second housing 68. The plurality of extender walls 108 comprises a pair of opposing extender walls 110, a back extender wall 112 and a front extender wall 114. Each opposing extender wall 110 is coupled to and extends between a respective opposing side 32 of the first housing 12 and a respective opposing side face 86 of the second housing 68. The back extender wall 112 is coupled to and extends between the back 50 of the first housing 12 and a back face 116 of the second housing 68. The front extender wall 114 is coupled to and extends between the pair of opposing extender walls 110. The front extender 114 wall is coupled to the first bottom 16 of the first housing 12 between the orifice 28 and the front 70 defining an overhang of the first housing 12. A respective one of the plurality of third connectors 74 is coupled to a bottom edge 120 of a respective opposing extender wall 110. A respective one of the plurality of third connectors 74 is coupled to a bottom edge 122 of the back extender wall 112.

Preferably, the first housing 12, the second housing 68 and the plurality of extender walls 108 comprise plastic.

In use, the vertical sections 18 are coupled together and to the second bottom 68. The reservoir 64, filled with water and then frozen, is inverted with the open neck 66 positioned through the orifice 28 positioned in the first bottom 16 of the first housing 12. As the ice melts, cold water is collected in the bowl 96, which is positioned in the second housing 68. The cold water in the bowl 96 is available to pets or other animals.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cold water dispensing device comprising:
a first housing, said first housing having a first top, said first top being open, said first top and a first bottom of said first housing being squarely shaped, such that said first housing is rectangularly box shaped, said first housing comprising two vertical sections;
a plurality of first connectors, each said first connector being coupled to a respective edge of a respective said first vertical section;
a plurality of second connectors, said plurality of second connectors being complementary to said plurality of first connectors, each said second connector being coupled to a respective edge of a respective said second vertical section; and wherein each said second connector is couplable to an associated said first connector;
an orifice, said orifice being centrally positioned through said first bottom of said first housing, said orifice being circular;
a reservoir, said reservoir being complementary to and positionable in said first housing, said reservoir having an open neck, said open neck being complementary to said orifice, wherein said open neck is positioned on said reservoir such that water is addable to said reservoir with said reservoir positioned uprightly, and such that said reservoir is configured to accommodate freezing of the water contained in said reservoir;
a second housing, said second housing being couplable to said first bottom of said first housing, said second housing extending transversely past a front of said first housing, said second housing having a second top, said second top being open;
a plurality of third connectors, each said third connector being coupled to a bottom rim of said first housing;
a plurality of fourth connectors, said plurality of fourth connectors being complementary to said plurality of third connectors, each said fourth connector being coupled to a top rim of said second housing, wherein each said fourth connector is couplable to an associated said third connector, such that said second housing is couplable to said first housing;

a bowl, said bowl being complementary to said second housing, wherein said bowl is insertable through said second top to rest on a second bottom of said second housing; and a plurality of extender walls, said plurality of extender walls being coupled to and extending between said first housing and said second housing, such that said first bottom of said first housing is positioned above said second top of said second housing, said plurality of extender walls comprising a pair of opposing extender walls, each said opposing extender wall being coupled to and extending between a respective opposing side of said first housing and a respective opposing side face of said second housing, a back extender wall, said back extender wall being coupled to and extending between a back of said first housing and a back face of said second housing, a front extender wall, said front extender wall being coupled to and extending between said pair of opposing extender walls, said front extender wall being coupled to said first bottom of said first housing between said orifice and said front defining an overhang of said first housing, and one of said plurality of third connectors being coupled to a bottom edge of a respective said opposing extender wall, another one of said plurality of third connectors being coupled to a bottom edge of a said back extender wall.

2. The device of claim 1, further comprising:
said plurality of first connectors comprising four first connectors;
said plurality of second connectors comprising four second connectors; and
each said second connector and said associated said first connector comprising a first snap connector.

3. The device of claim 1, further comprising:
said plurality of third connectors comprising four third connectors;
said plurality of fourth connectors comprising four fourth connectors; and
each said fourth connector and said associated said third connector comprising a second snap connector.

4. The device of claim 1, further comprising:
a lid, said lid being complementary to said first top, said lid being hingedly coupled to said respective opposing side of said first housing proximate to an upper rim of said first housing, such that said lid is positioned to cover said first top; and
a handle, said handle being coupled to said lid distal from said respective opposing side, such that said handle is positioned for grasping by a user to open said lid.

5. The device of claim 4, further comprising:
a pair of first hinge rings, each said first hinge ring being coupled to said lid;
a second hinge ring, said second hinge ring being coupled to said respective opposing side of said first housing proximate to said upper rim, wherein said second hinge ring is alignable with said pair of first hinge rings;
a hinge rod, said hinge rod being insertable through said pair of first hinge rings and said second hinge ring, such that said lid is hingedly coupled to said first housing;

said handle comprising a pair of verticals and a horizontal, each said vertical being coupled to and extending perpendicularly from said lid, said horizontal being coupled to and extending between said pair of verticals distal from said lid, such that said horizontal is positioned in parallelism with said lid and wherein fingers of the user are insertable between said horizontal and said lid.

6. The device of claim 1, further including a plurality of couplers, each said coupler being coupled to said back of said first housing proximate to said first bottom of said first housing, said plurality of couplers being configured to attach said first housing to a post.

7. The device of claim 6, further including said plurality of couplers comprising:
a plurality of holes, each said hole being positioned through said back of said first housing, and
a plurality of ties, said plurality of ties being complementary to said plurality of holes, wherein said plurality of ties are positionable through respective holes of said plurality of holes and around the post.

8. The device of claim 7, further comprising:
said plurality of holes comprising:
a pair of bottom holes, said pair of bottom holes being positioned through said back in horizontal alignment proximate to said first bottom, and
a pair of top holes and each said top hole being positioned in vertical alignment with a respective said bottom hole;
said plurality of ties comprising:
a top tie, said top tie being positionable through said pair of top holes and around the post, and
a bottom tie, said bottom tie being positionable through said pair of bottom holes and around the post; and
wherein said top tie and said bottom tie are knotable to couple said first housing to the post.

9. The device of claim 1, further including said reservoir being semi-rigid, said reservoir comprising deformable plastic.

10. The device of claim 1, further including a plurality of fasteners, each said fastener being coupled to said respective opposing side face of said second housing proximate to said second bottom of said second housing, wherein said plurality of fasteners are configured to couple said second housing to a horizontal surface.

11. The device of claim 10, further including said plurality of fasteners comprising:
a plurality of loops, said plurality of loops being coupled to the respective opposing side face of said second housing proximate to said second bottom of said second housing;
a plurality of spikes, said plurality of spikes being complementary to said plurality of loops, each said spike being insertable through a respective said loop; and
wherein said plurality of loops are positioned for insertion of said plurality of spikes, such that said plurality of spikes are drivable into the horizontal surface to couple said second housing to the horizontal surface.

12. The device of claim 11, further comprising:
said plurality of loops comprising four loops, each said loop being positioned proximate to a respective corner of said second housing; and
said plurality of spikes comprising four spikes.

13. The device of claim 1, further comprising:
said bowl having internal edges, said internal edges being rounded; and
said bowl comprising stainless steel.

14. The device of claim 13, further including a grab, said grab being coupled to a front lip of said bowl, said grab being coupled to and extending between opposing edges of said bowl.

15. The device of claim 1, further including said first housing, said second housing and said plurality of extender walls comprising plastic.

16. A cold water dispensing device comprising:
- a first housing, said first housing having a first top, said first top being open, said first top and a first bottom of said first housing being squarely shaped, such that said first housing is rectangularly box shaped, said first housing comprising two vertical sections;
- a plurality of first connectors, each said first connector being coupled to an associated edge of one of said vertical sections;
- a plurality of second connectors, said plurality of second connecters being complementary to said plurality of first connectors, each said second connector being coupled to an associated edge of another one of said vertical sections, such that each said second connector is couplable to an associated said first connector;
- said plurality of first connectors comprising four first connectors, said plurality of second connectors comprising four second connectors, each said second connector and said associated said first connector comprising a first snap connector;
- an orifice, said orifice being centrally positioned through said first bottom of said first housing, said orifice being circular;
- a lid, said lid being complementary to said first top, said lid being hingedly coupled to a respective opposing side of said first housing proximate to an upper rim of said first housing, such that said lid is positioned to cover said first top;
- a pair of first hinge rings, each said first hinge ring being coupled to said lid;
- a second hinge ring, said second hinge ring being coupled to said respective opposing side of said first housing proximate to said upper rim, wherein said second hinge ring is alignable with said pair of first hinge rings;
- a hinge rod, said hinge rod being insertable through said pair of first hinge rings and said second hinge ring, such that said lid is hingedly coupled to said first housing;
- a handle, said handle being coupled to said lid distal from said respective opposing side of said first housing, such that said handle is positioned for grasping by a user to open said lid, said handle comprising a pair of verticals and a horizontal, each said vertical being coupled to and extending perpendicularly from said lid, said horizontal being coupled to and extending between said pair of verticals distal from said lid, such that said horizontal is positioned in parallelism with said lid and wherein fingers of the user are insertable between said horizontal and said lid;
- a plurality of couplers, each said coupler being coupled to a back of said first housing proximate to said first bottom of said first housing, said plurality of couplers being configured to attach said first housing to a post, said plurality of couplers comprising:
  - a plurality of holes, each said hole being positioned through said back of said first housing, said plurality of holes comprising a pair of top holes and a pair of bottom holes, said pair of bottom holes being positioned through said back in horizontal alignment proximate to said first bottom, each said top hole being positioned in vertical alignment with a respective said bottom hole, and
  - a plurality of ties, said plurality of ties being complementary to said plurality of holes, wherein said plurality of ties are positionable through respective holes of said plurality of holes and around the post, said plurality of ties comprising a top tie and a bottom tie, said top tie being positionable through said pair of top holes and around the post, said bottom tie being positionable through said pair of bottom holes and around the post, wherein said top tie and said bottom tie are knotable to couple said first housing to the post;
- a reservoir, said reservoir being complementary to and positionable in said first housing, said reservoir having an open neck, said open neck being complementary to said orifice, wherein said open neck is positioned on said reservoir such that water is addable to said reservoir with said reservoir positioned uprightly, and such that said reservoir is configured to accommodate freezing of the water contained in said reservoir, said reservoir being semi-rigid, said reservoir comprising deformable plastic;
- a second housing, said second housing being couplable to said first bottom of said first housing, said second housing extending transversely past a front of said first housing, said second housing having a second top, said second top being open;
- a plurality of third connectors, each said third connector being coupled to a bottom rim of said first housing;
- a plurality of fourth connectors, said plurality of fourth connectors being complementary to said plurality of third connectors, each said fourth connector being coupled to a top rim of said second housing, wherein each said fourth connector is couplable to an associated said third connector, such that said second housing is couplable to said first housing;
- said plurality of third connectors comprising four third connectors, said plurality of fourth connectors comprising four fourth connectors, each said fourth connector and said associated said third connector comprising a second snap connector;
- a plurality of fasteners, each said fastener being coupled to a respective opposing side face of said second housing proximate to a bottom of said second housing, wherein said plurality of fasteners are configured to couple said second housing to a horizontal surface, said plurality of fasteners comprising:
  - a plurality of loops, said plurality of loops being coupled to said respective opposing side face of said second housing proximate to said bottom of said second housing, said plurality of loops comprising four loops, each said loop being positioned proximate to a respective corner of said second housing,
  - a plurality of spikes, said plurality of spikes being complementary to said plurality of loops, each said spike being insertable through a respective said loop, said plurality of spikes comprising four spikes, and wherein said plurality of loops are positioned for insertion of said spikes, such that said spikes are drivable into the horizontal surface to couple said second housing to the horizontal surface;
- a bowl, said bowl being complementary to said second housing, wherein said bowl is insertable through said second top to rest on said bottom of said second housing, said bowl having internal edges, said internal edges being rounded, said bowl comprising stainless steel;

a grab, said grab being coupled to a front lip of said bowl, said grab being coupled to and extending between opposing edges of said bowl;

a plurality of extender walls, said plurality of extender walls being coupled to and extending between said first housing and said second housing, such that said first bottom of said first housing is positioned above said second top of said second housing, said plurality of extender walls comprising a pair of opposing extender walls, a back extender wall and a front extender wall, each said opposing extender wall being coupled to and extending between said respective opposing side of said first housing and said respective opposing side face of said second housing, said back extender wall being coupled to and extending between said back of said first housing and a back face of said second housing, said front extender wall being coupled to and extending between said pair of opposing extender walls, said front extender wall being coupled to said first bottom of said first housing between said orifice and said front defining an overhang of said first housing, a respective one of said plurality of third connectors being coupled to a bottom edge of a respective said opposing extender wall, a respective one of said plurality of third connectors being coupled to a bottom edge of a said back extender wall;

said first housing, said second housing and said plurality of extender walls comprising plastic.

\* \* \* \* \*